US012807026B2

(12) United States Patent
Beaurepaire et al.

(10) Patent No.: US 12,807,026 B2
(45) Date of Patent: Nov. 24, 2026

(54) PERSONALIZED RECOMMENDATIONS OF EV CHARGE POINTS THROUGH MACHINE LEARNING OF CONTEXTUAL CHARGING BEHAVIORS

(71) Applicant: HERE GLOBAL B.V., Eindhoven (NL)

(72) Inventors: Jerome Beaurepaire, Nantes (FR); Jeremy Michael Young, Beverly Hills, MI (US)

(73) Assignee: HERE GLOBAL B.V., Eindhoven (NL)

( * ) Notice: Subject to any disclaimer, the term of this patent is extended or adjusted under 35 U.S.C. 154(b) by 45 days.

(21) Appl. No.: 18/974,850

(22) Filed: Dec. 10, 2024

(65) Prior Publication Data

US 2026/0158959 A1 Jun. 11, 2026

(51) Int. Cl.
*B60L 53/66* (2019.01)
*B60L 53/68* (2019.01)

(52) U.S. Cl.
CPC ............... *B60L 53/66* (2019.02); *B60L 53/68* (2019.02); *B60L 2240/72* (2013.01); *B60L 2260/46* (2013.01)

(58) Field of Classification Search
CPC ....... B60L 53/66; B60L 53/68; B60L 2240/72
See application file for complete search history.

(56) References Cited

U.S. PATENT DOCUMENTS

| | | | |
|---|---|---|---|
| 9,514,651 | B2 | 12/2016 | Linder et al. |
| 9,766,625 | B2 | 9/2017 | Boroditsky et al. |
| 2019/0275893 | A1 | 9/2019 | Sham |

(Continued)

FOREIGN PATENT DOCUMENTS

| | | | | |
|---|---|---|---|---|
| CN | 118014289 | A * | 5/2024 | ............. G06Q 50/06 |
| DE | 102022114827 | A1 * | 12/2023 | ......... G01C 21/3469 |
| KR | 1020220066632 | A | 5/2022 | |

OTHER PUBLICATIONS

Yujing et al., "Personalized Navigation of Electric Vehicle Charging Station Based on Collaborative Filtering", IEEE, 2019, pp. 849-855.

(Continued)

*Primary Examiner* — Scott A Browne
*Assistant Examiner* — Josephine Rich
(74) *Attorney, Agent, or Firm* — Michael Yu; HERE GLOBAL B.V.

(57) ABSTRACT

A method, system and computer program product for determining personalized recommendations of EVCPs based on contextual charging behavior of a user are disclosed. The method includes determining that the user needs to charge the electric vehicle; determining contextual conditions related to personal preferences of the user, a vehicle type of the electric vehicle and/or a location of the electric vehicle; determining features and contextual conditions related to the EVCPs; preparing a list of EVCPs in a predetermined distance from the location of the electric vehicle; ranking, by a trained machine learning model, the list of EVCPs based on the contextual conditions related to personal preferences of the user, the vehicle type of the electric vehicle and/or the location of the electric vehicle; and providing, by a vehicle interface system, a portion of the ranked list of the one or more EVCPs.

20 Claims, 4 Drawing Sheets

(56) References Cited

U.S. PATENT DOCUMENTS

| | | | | |
|---|---|---|---|---|
| 2021/0046843 | A1* | 2/2021 | Maeda | G01C 21/3469 |
| 2022/0357171 | A1 | 11/2022 | Pedersen | |
| 2023/0051766 | A1 | 2/2023 | Beaurepaire et al. | |
| 2023/0267782 | A1* | 8/2023 | Ucar | G07C 5/085<br>701/31.7 |
| 2025/0303905 | A1* | 10/2025 | Gupta | B60L 53/62 |

OTHER PUBLICATIONS

"IMT-2020" Wikipedia, Retrieved on Nov. 12, 2024, Webpage available at https://en.wikipedia.org/wiki/IMT-2020.

"IEEE 802.11" Wikipedia, Retrieved on Aug. 8, 2024, Webpage available at https://en.wikipedia.org/wiki/IEEE_802.11.

"IEEE 802.16" Wikipedia, Retrieved on Nov. 12, 2024, Webpage available at https://en.wikipedia.org/wiki/IEEE_802.16.

* cited by examiner

PERSONALIZED RECOMMENDATIONS OF EV CHARGE POINTS THROUGH MACHINE LEARNING OF CONTEXTUAL CHARGING BEHAVIORS

TECHNOLOGICAL FIELD

An example aspect of the present disclosure generally relates to providing recommendations for electric vehicle charging points (EVCPs) near an EV user, and more particularly, but without limitation relates to a system, a method, and a computer program product to for determining personalized recommendations of EVCPs based on contextual charging behavior of a user.

BACKGROUND

As the number of EV charging stations keeps increasing around the world, EV owners might be able to chose the ones they prefer in the future, based on their preferences. What is lacking is a way to learn those preferences by analysing the EV owner's behaviors going to those stations together with the contexts associated to those visits in order to make more accurate recommendations in the future, especially when some of those preferences might be missing.

In order to do that, there would need to be some labelling of the EV charging experience to establish those key preferences, similar to Netflix recommendations based partly on historical patterns. The system might then be able to infer the reason why user would not go any more to a given charging point, based on such contextual understanding.

BRIEF SUMMARY

The present disclosure provides a system, a method and a computer program product to determine personalized recommendations of electric vehicle charging points based on contextual charging behavior of a user, in accordance with various aspects.

Aspects of the disclosure provide a computer implemented method for determining personalized recommendations of electric vehicle charging points (EVCPs) based on contextual charging behavior of a user. The method may include determining, by a processor in an electric vehicle, that the user needs to charge the electric vehicle; determining, by the processor in the electric vehicle, a plurality of contextual conditions related to personal preferences of the user, a vehicle type of the electric vehicle and/or a location of the electric vehicle; determining, from sensors in communication with one or more EVCPs, a plurality of features and a plurality of contextual conditions related to the one or more EVCPs; preparing a list of one or more EVCPs in a predetermined distance from the location of the electric vehicle; ranking, by a trained machine learning model, the list of the one or more EVCPs based on the plurality of contextual conditions related to personal preferences of the user, the vehicle type of the electric vehicle and/or the location of the electric vehicle; and providing, by a vehicle interface system, a portion of the ranked list of the one or more EVCPs.

Aspects of the disclosure may provide a system for determining personalized recommendations of EVCPs based on contextual charging behavior of a user. The system may include at least one memory configured to store computer executable instructions; and at least one processor configured to execute the computer executable instructions to: determine, by a processor in an electric vehicle, that the user needs to charge the electric vehicle;

determine, by the processor in the electric vehicle, a plurality of contextual conditions related to personal preferences of the user, a vehicle type of the electric vehicle and/or a location of the electric vehicle; determine, from sensors in communication with one or more EVCPs, a plurality of features and a plurality of contextual conditions related to the one or more EVCPs; prepare a list of one or more EVCPs in a predetermined distance from the location of the electric vehicle; rank, by a trained machine learning model, the list of the one or more EVCPs based on the plurality of contextual conditions related to personal preferences of the user, the vehicle type of the electric vehicle and/or the location of the electric vehicle; and provide, by a vehicle interface system, a portion of the ranked list of the one or more EVCPs.

Aspects of the disclosure may provide a computer program product comprising a non-transitory computer readable medium having stored thereon computer executable instructions, which when executed by one or more processors, cause the one or more processors to carry out operations to determine personalized recommendations of EVCPs based on contextual charging behavior of a user. The operations may include operations for: determining, by a processor in an electric vehicle, that the user needs to charge the electric vehicle; determining, by the processor in the electric vehicle, a plurality of contextual conditions related to personal preferences of the user, a vehicle type of the electric vehicle and/or a location of the electric vehicle; determining, from sensors in communication with one or more EVCPs, a plurality of features and a plurality of contextual conditions related to the one or more EVCPs; preparing a list of one or more EVCPs in a predetermined distance from the location of the electric vehicle; ranking, by a trained machine learning model, the list of the one or more EVCPs based on the plurality of contextual conditions related to personal preferences of the user, the vehicle type of the electric vehicle and/or the location of the electric vehicle; and providing, by a vehicle interface system, a portion of the ranked list of the one or more EVCPs.

The foregoing summary is illustrative only and is not intended to be in any way limiting. In addition to the illustrative aspects, aspects, and features described above, further aspects, aspects, and features will become apparent by reference to the drawings and the following detailed description.

BRIEF DESCRIPTION OF THE DRAWINGS

Figure 1:
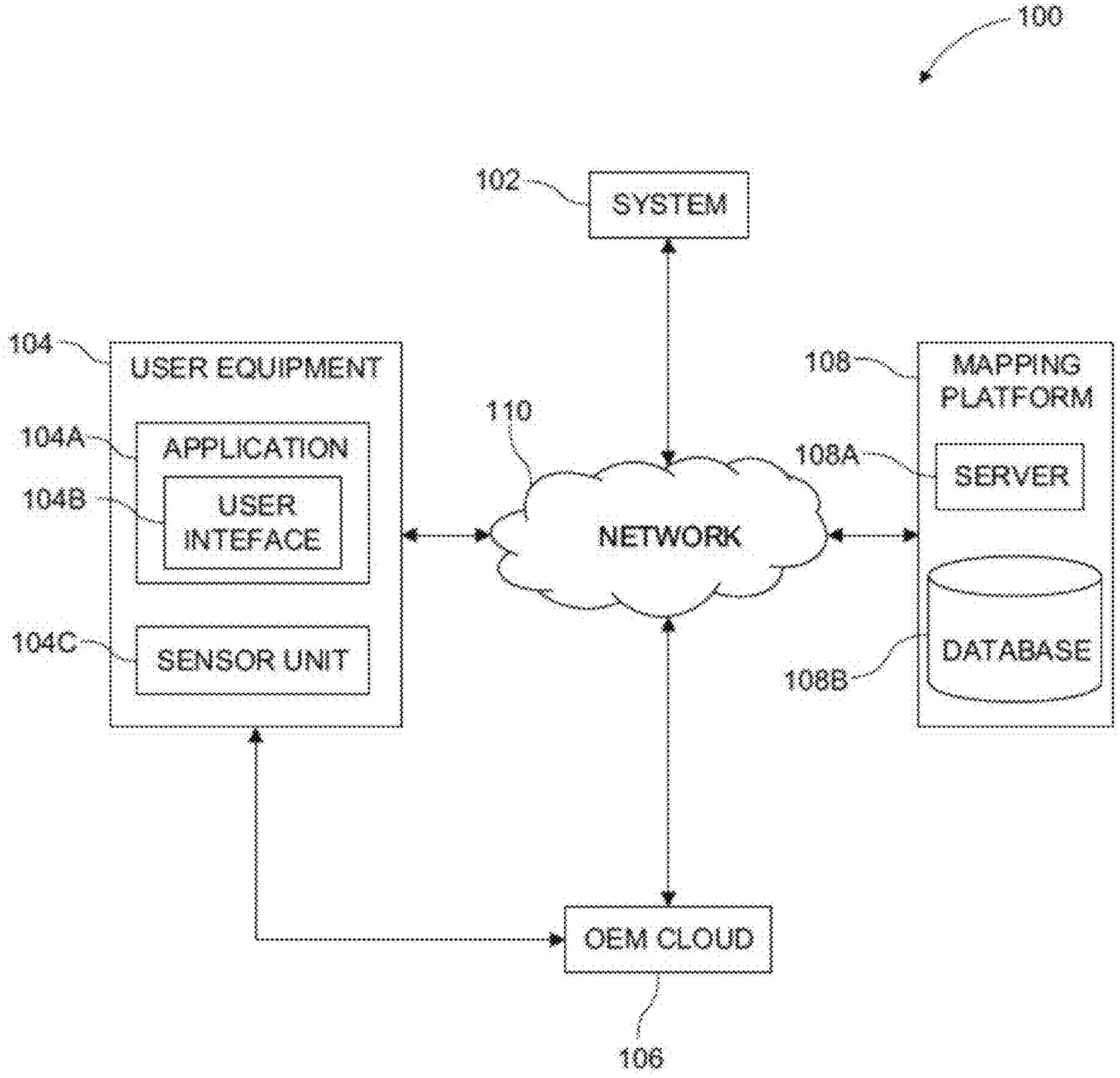
Figure 2:
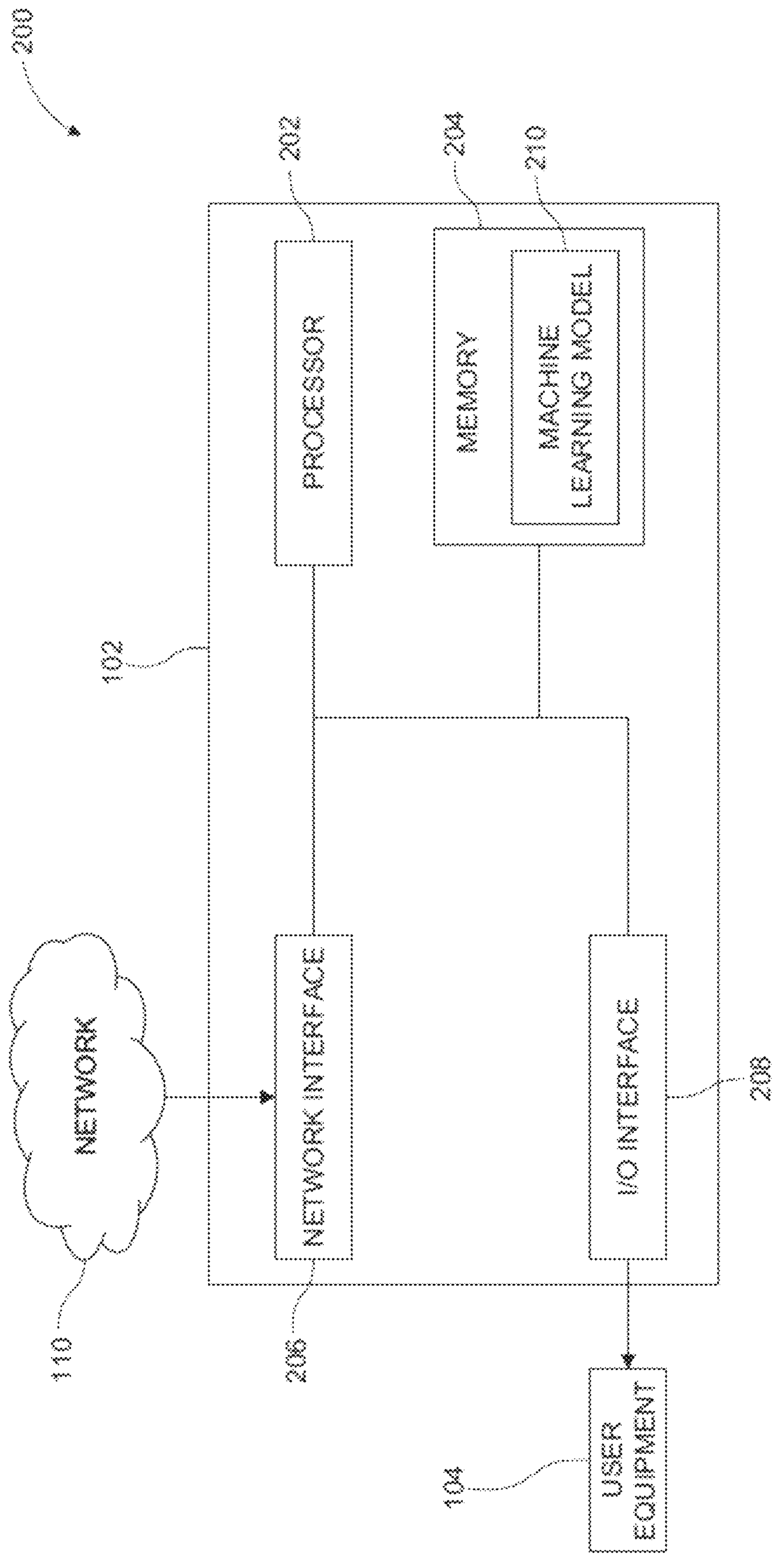
Figure 3:
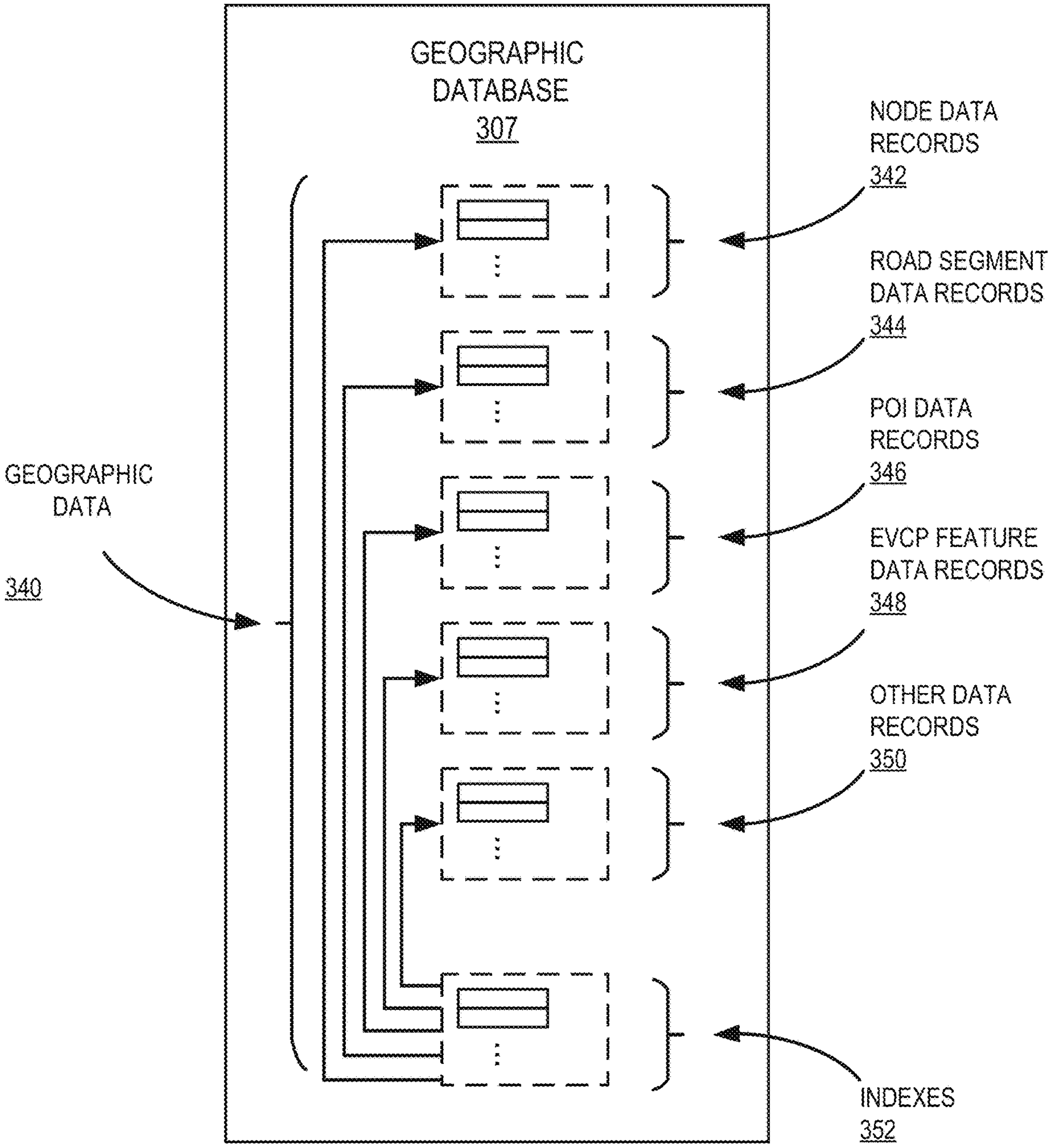
Figure 4:
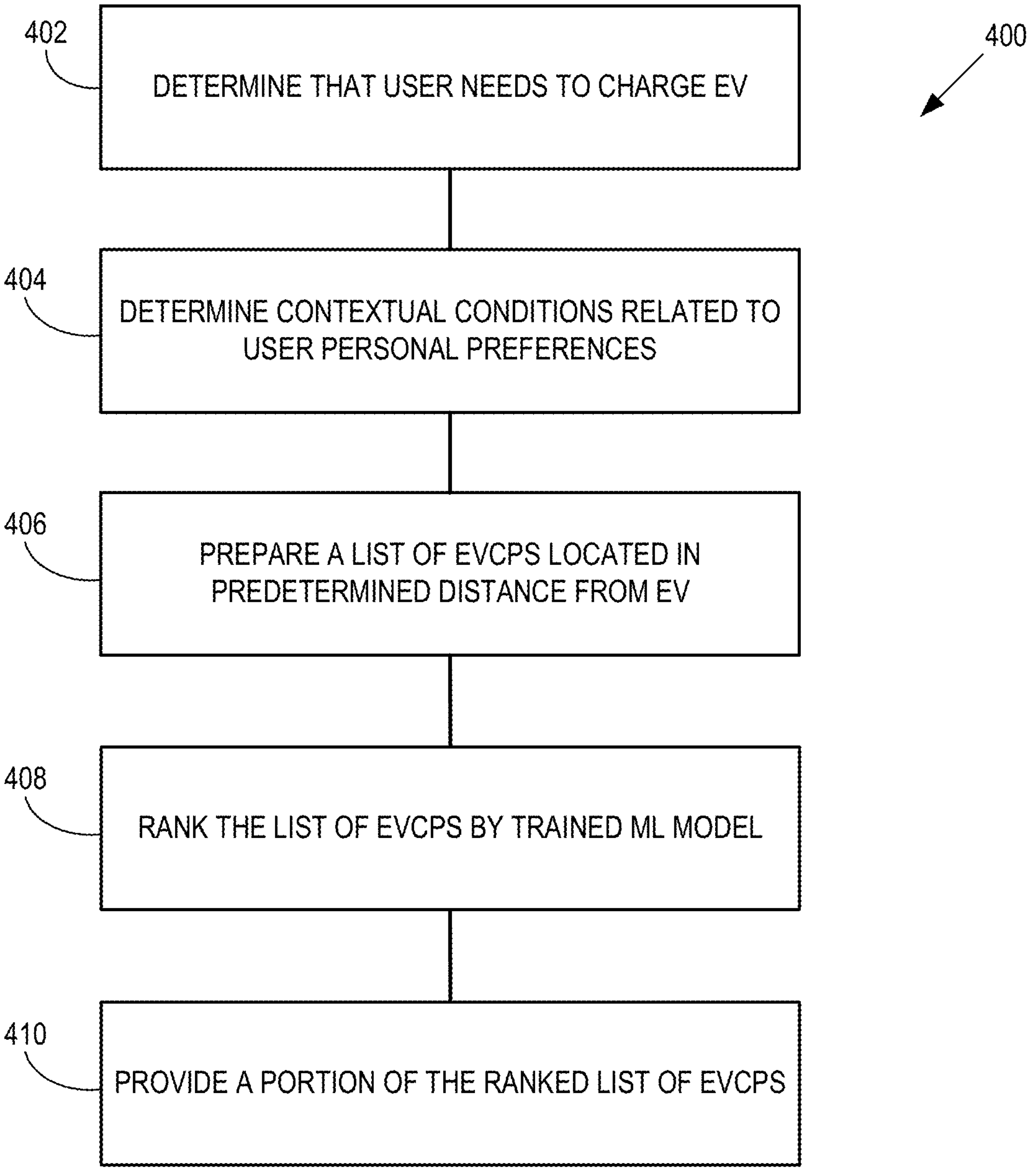

Having thus described certain aspects of the disclosure in general terms, reference will now be made to the accompanying drawings, which are not necessarily drawn to scale, and wherein:

FIG. 1 illustrates a schematic diagram of a network environment 100 of a system 102 for determining personalized recommendations of EVCPs based on contextual charging behavior of a user, in accordance with an example aspect;

FIG. 2 illustrates a block diagram of the system for determining personalized recommendations of EVCPs based on contextual charging behavior of a user, in accordance with an example aspect;

FIG. 3 illustrates an example map or geographic database for use by the system for determining personalized recommendations of EVCPs based on contextual charging behavior of a user, in accordance with an example aspect; and FIG. 4 illustrates a flowchart 400 for acts taken in an exemplary method for determining personalized recommendations of EVCPs based on contextual charging behavior of a user, in accordance with an aspect.

DETAILED DESCRIPTION

Some aspects of the present disclosure will now be described more fully hereinafter with reference to the accompanying drawings, in which some, but not all, aspects are shown. Indeed, various aspects may be embodied in many different forms and should not be construed as limited to the aspects set forth herein; rather, these aspects are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with aspects of the present disclosure. Thus, use of any such terms should not be taken to limit the spirit and scope of aspects of the present disclosure.

For purposes of this disclosure, though not limiting or exhaustive, "vehicle" refers to standard gasoline powered vehicles, hybrid vehicles, an electric vehicle, a fuel cell vehicle, and/or any other mobility implement type of vehicle (e.g., bikes, scooters, etc.). The vehicle includes parts related to mobility, such as a powertrain with an engine, a transmission, a suspension, a driveshaft, and/or wheels, etc. The vehicle may be a non-autonomous vehicle or an autonomous vehicle. The term autonomous vehicle (AV) may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one aspect, the vehicle may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

EVCPs may be characterized by many different features or attributes. For example:

1. Charging Speed/Power Level: Level 1 (Standard Outlet, 120V), Level 2 (240V), DC Fast Charging (e.g., CHAdeMO, CCS, Tesla Supercharger);
2. Connector Types: CHAdeMO, CCS (Combo 1/Combo 2), Tesla, Type 1 (J1772), Type 2 (Mennekes), Others (e.g., GB/T in China);

3. Number of Charging Ports: How many vehicles can be charged simultaneously;
4. Availability/Status: Available, In use, Out of service;
5. Pricing: Free, Pay per kWh; Pay per hour, Subscription-based;
6. Location: GPS coordinates, address, and potential landmarks associated to this location or around it;
7. Operating Hours: 24/7, business hours, or specific time frames;
8. Supported Network: e.g., ChargePoint, EVgo, Electrify America, Tesla Supercharger;
9. Payment Methods Accepted: Credit card, Mobile payment (e.g., Apple Pay, Google Wallet), Membership card, Cash;
10. Reservation Capabilities: Whether you can reserve a spot in advance;
11. On-site Amenities: Restrooms, Cafes/restaurants, Wi-Fi, Waiting area;
12. Energy Source: Grid-sourced, Solar-powered, Wind-powered, Battery storage backup;
13. Safety Features: Surveillance cameras, Emergency call button, Lighting;
14. Accessibility Features: Wheelchair accessible, Close to public transit;
15. Feedback/Reviews: User ratings, comments, and recent experiences;
16. Real-time Data: Information on queue/wait times, especially for popular locations;
17. Type of Location: Highway rest stop, Shopping center, Urban downtown area, Residential area;
18. Parking Space Size: Adequate for cars, SUVs, trucks, etc.;
19. Duration Limit: Maximum time a vehicle is allowed to remain connected;
20. Branding/Advertisements: Brand partnerships or sponsorships related to the EVCP;
21. Emergency Shutdown: In case of emergencies, an option to quickly cut off the power supply;
22. Weather Protection: Canopy or shelter, especially in areas prone to adverse weather conditions;
23. Backup Power: In case of grid failures, some EVCPs may have generators or battery backups;
24. Parking Direction: For example Back In, Pull Through, Parallel Parking, Angled Parking;
25. CP Reliability: A location may have a score associated with maintenance/working status issues. May not be reported as out of service yet;
26. Environmental Controlled Due to extreme temperatures (heat/cold) some locations may offer environmental control for comfort and more efficient charging;
27. Number of Times Visited If location is frequently visited by EV operator, or never visited;

This is not an exhaustive list and could vary based on region, technological advancements, and other factors. These features give a broad overview of what EV owners might consider when looking at or searching for EVCPs based on personal preferences of the users.

The disclosed system and method for determining personalized recommendations of electric vehicle charging points based on contextual charging behavior of a user may leverage different data sources for use in the collection of data process and training and leveraging a machine learning (ML) model.

In an aspect of the disclosure, examples of possible data sources to use for the collection process and the ML model generation include, but are not limited to:

Audio (sounds, noise, user discussions, etc);

- Images;
- pattern recognition—for example, someone struggling with the cables, the payment, the water on the ground image recognition;
- User reviews (ML/LLM to extract/summarize content);
- dwell times measured on-site;
- durations: waiting; charging; determining the energy from the EVCP indirectly based on the energy increased level (eg. +25%) divided by time from the EVCP attribute indirectly; Peak time (learn based on time of day, etc grid related; time to charge (between parking and charging);
- Satellite imagery: Covered/uncovered; Number of locations; Business levels queues;
- EVCPs which are not straightforward to see; EV guidance: We know/guess the EV charging point you are looking for is behind that wall and people have been struggling with it;
- Synchronization of User Data through Google/Apple type personal eco-systems of calendars of events;
- Onboard Microphones: detect key descriptive words concerning experiences; detect key deviations in ML anticipated behavior.

This is a non-exhaustive list of sources of data that may be collected and used by the disclosed system and method for determining personalized recommendations of electric vehicle charging points based on contextual charging behavior of a user.

In an aspect of the disclosure, the system and method for determining personalized recommendations of electric vehicle charging points based on contextual charging behavior of a user may learn the EV owner's static preferences for EVCP attributes and features. For example, the EV owner's static personal preferences may include, but are not limited to:

- Brands
- Proximity
- Parking possible
- Type of chargers
- Covered space
- Modes of payment
- Number of available EVCP
- Quality of the environment
- View/landscape around
- Premium features
- Ability to do something while waiting
- Convenience
- etc.

In an aspect, the disclosed system and method may output a table with a weighted value for each of these attributes.

In an example, if a driver goes to a particular EVCP, the system needs to understand if that was a positive experience or not. Then, the system may automatically label the data based on this. Then, the system may attempt to derive what this user cares most about: eg. fast charging. This could then be fed into the EVCP recommendation system.

In an aspect, the system may then compare all those attributes with the EVCPs most frequently visited. The system may then draw some conclusions when a driver is not going to the nearest or most obvious EVCP or makes any deviation to a route.

In an aspect, the disclosed system and method may measure implicitly the impact of some attributes detected by going there and using this feature/attribute. The disclosed system and method may measure explicitly the impact of some attributes that a user may be talking about regarding a feature, complaining, reporting or voice interface.

In an aspect, the disclosed system could also learn about a user going to an EVCP and never going back although it would have been an option on the route. This may mean that something in the past EVCP experience was bad.

The disclosed system might not always be able to draw that conclusion after one or two data points but after gathering lots of historical data, it might be able to deduce, sometimes after months or years, what was likely wrong with that EVCP experience. Therefore, it is important that the system keeps track of the feature sets of any EVCP as those might evolve over time (eg. the bad experience might be due to American Express payment not being supported but it was then implemented two years later).

In another example, a user may have never been to a particular EVCP and won't go because it is missing a key feature. The disclosed system needs to know that user has seen/read some information at the EVCP location, such as "no fast charging", which could for example be done by image recognition.

In an aspect of the disclosure, the disclosed system and method for determining personalized recommendations of electric vehicle charging points based on contextual charging behavior of a user may learn the EV owner's dynamic and/or contextual preferences for EVCP features and attributes. Some examples include but are not limited to:

- Wait times/queues;
- Noise levels;
- Weather;
- Congestion around;
- Available time of the driver (is the driver in a rush or not);
- Charging capacity (if the grid does some load balancing and does not allow high capacity at this time);
- Open shop/cinema near the EVCP;
- User reviews;
- Safety related features: at night, presence of emergency phone as no person may be in the shop unlike for gasoline;
- Construction on route;
- Friction/difficulty to get to a given place/EVCP;
- Variance in ETA, charging, etc.;
- Likelihood to find an iced-over EVCP in winter;
- Other dynamic, context-dependent preferences.

In an aspect of the disclosure, from both historical and direct feedback that has been labeled and captured, this data is compared against dynamic realtime events to EVCPs within logical range, the disclosed system can apply these dynamic preferences to identify the most likely preferred EVCP to propose. For example, due to time of day and traffic congestion, maybe a user does not prefer to go to an EVCP because of the difficulty to get to the location and would rather go to a secondary location that offers easier navigation. For example, this may remove the need for multiple left turns with long waits in congested traffic. However, under difference dynamic situations, that same user would prefer this CP location.

Another example may be that during conditions after sunset, safety is a concern for some locations due to lighting. Another example could be that during precipitation events the user always prefers covered charge points and will never use an uncovered.

In an aspect of the disclosure the disclosed system prepares a list of one or more electric vehicle charging points in a predetermined distance from the location of the electric vehicle. In an aspect, the system may then rank, by a trained machine learning model, the list of the one or more electric vehicle charging points based on the plurality of contextual conditions related to personal preferences of the user, the vehicle type of the electric vehicle and/or the location of the electric vehicle. In an aspect of this ranking, the system may adapt the recommendation by highlighting the ML preferences not available at the suggested station. Based on the previously described features, the system would be able to make more advanced recommendations like: "we recommend you to go to this EVCP because it has features 1, 2, 3, etc, but be aware that it does not have feature 7 and 13 which we know is important for you in the current context."

This may have the advantage to be fully transparent for the user and build a trust relationship with the system for this recommendation and the upcoming ones.

In an aspect of the disclosure, the disclosed system may perform the ranking by determining one or more exceptional situations related to the user needing to charge the electric vehicle at the electric vehicle charging point and determining a frequency of the one or more exceptional situations; and excluding an occurrence of the one or more exceptional situations from the ranked list.

The disclosed system may need to understand what is an "exceptional" or "emergency" situation and hence not label the features the same way in such situations. For example, there may be a situation in which the user needs to charge due to low battery and s/he would take any station around. It may be important to label those occurrences properly as the system should not attempt to learn the preferences in such cases. In those situations, the main relevant criteria applied may be the distance (closest EVCP).

The disclosed system may more accurately detect these exceptional situations:

- based on the charging level in relation to the user's charging comfort zone (e.g., user getting stressed when below 15%);
- if the selected EVCP was the closest among a few candidates and was ranked lower in term of matching user's preferences in a similar context;
- if manually indicated by the user: "Let's go to this EVCP but it is only because I have no other option, I generally do not like this brand and this type of EVCP."

These are non-exhaustive examples for how the disclosed system may learn what an "exceptional" or "emergency" situation would be. In an aspect, the disclosed system may also learn how frequently those emergency situations happens and factor this into the ranking of "exceptional/emergency" situations.

In an aspect of the disclosure, the disclosed system may perform the ranking, by the trained machine learning model, of the list of the one or more electric vehicle charging points by determining a mobility graph of the user and adjusting the ranked list based on the mobility graph of the user. Users would generally have some preferences about the EVCP they go to on a regular basis, so there might not be a strong need for recommendations in such cases as those are the "usual EVCPs." In an aspect, the disclosed system would learn when and ideally why they go there (is it proximity, time based, matching a schedule or routine, or other factors). This may be arranged in relationship to the known places relevant for the user-home and/or places user travel to frequently (work, gym, family) with which the user has some familiarity. In a similar way, the system would learn which areas are the "unknown areas" in which the user might need to receive contextual recommendations for EVCPs.

In an aspect of the disclosure, the disclosed system may recommend an EVCP when some key relevant feature becomes available after a while. In the context of fast changing environments and EV infrastructures, it is important to have up-to-date information and update the recommendations based on the latest data. Therefore, if the disclosed system detects that a given user does not go to some EVCP because one or more key attributes had been missing, it is important to notify her/him when those attributes get updated, possibly making this EVCP the most relevant in some context or higher ranked in the list.

In an aspect, for example, the system informs the user that "fast charging" just became available at this station. In another aspect, for example, the system had not recommended the EVCP near Main Street for you in the past but "fast charging" became available at this station last week, so it becomes a better choice for you now. Should we go there now as your battery level is <10% and there is no waiting time at the station?

In an another aspect of the disclosure, the disclosed system may perform the ranking, by the trained machine learning model, of the list of the one or more electric vehicle charging points by determining a list of missing features in the list of the one or more electric vehicle charging points; and determining a recommended electric vehicle charging point based on the list of missing features and the personal preferences of the user.

For example: there are only 2 options to EV charge around, and one of them is covered (from rain) as user would generally prefer. The other has a Tesla "fast charging" EVCP which is also regularly chosen by the user. In an aspect, the system needs to be able to understand/learn what would this user be ready to compromise on, in this case: cover/roof or the use of a Tesla charging point. Hence, the disclosed system may make a prioritization of the missing attribute(s). The implementation of such feature could be done in several possible ways:

- Simply asking the user: Directly asking the user about the tradeoff to be made, by UI or voice: "Do you prefer X or Y?"
- Making a suggestion: "System recommends X because it has a roof but let me know if you prefer Y which would have Tesla fast charger."
- Based on learned behaviors: "System recommends X because it has a roof and historical data shows that 90% of your visits at EVCP were at stations with a roof."
- Based on contextual application of learnt behaviors: "System recommends X because it has a roof and historical data shows that this criteria is important for you, especially on days like today with heavy rain."
- In order to do that, the system may keep track of all the attributes of the EVCP visited over time, as well as the context under which each EVCP would be visited (e.g., rain, temperature, weekday, time of day, etc) so that the contextual models could be built.

A simpler way to do that or when not enough data has been collected would be to propose an EVCP feature list that a user would be able to manually reorder in order to help the system decide/prioritize. The system/user/car OEM could decide not to make compromises on some features which would be safety related.

Alternatively, the disclosed system may ask what the user would have high tolerance of. The system would not only consider the attributes of the EVCP and external factors like weather but also the current and projected battery levels as well as the general level of comfort this driver might have with the remaining battery level. For example, the system would know that a given user is very uncomfortable when the battery levels goes under 15% and therefore would be ready to compromise on all attributes in such case.

Risk averse people will prefer a safe battery buffer, so this needs to be taken into account as part of the decision making process leading to the suggested EVCP. The system could also suggest the option to have some EV truck coming and charge user's car if no EVCP option seems available.

In an aspect of the disclosure, the system may provide, by a vehicle interface system, the portion of the ranked list of the one or more electric vehicle charging points by notifying the user of a last electric vehicle charging point matching a set of the user's personal preferences before a predetermined range.

The system may determine that the user is now passing the last EVCP station that meets 80% of her/his requirements, and the next one will be meeting only 30%. Based on user's current range, the system may recommend that the user charge at this station in order to go to one station that meets her/his expectations standards. The system could then provide output to the user, such as: "This EVCP on your route in 2 km matches all your preferred criteria except X, the next one in 40 km only matches 30% of your desired criteria and you would need to drive 150 km to reach a station matching all your criteria, however your current range is only 120 km at this point."

In order to do that, the system may examine: learned preferences of the user; entered destination or predicted destination (e.g., based on a mobility graph); EV range expectation; or Attributes of the EVCP around and on the route.

In an aspect, the disclosed system may then compare all the EVCP stations based on the learned preferences of the user and contextually inform the user when this person is in the situation to miss an opportunity to go to a station matching most criteria, which won't happen soon after that.

With such a feature, the system may "understand" the user's needs and highlight contextually when something (e.g., an EVCP with matching attributes) is not available or going to be available.

In another aspect, the disclosed system may then make secondary recommendations based on user preferences to provide other options. For example, the system may state "Your ideal EVCP will be 5 kms away, and the next one will not be for 150 kms. However, 25 kms away is an EVCP that would be an option-however it is not a covered station."

In another aspect of the disclosure, the disclosed system may perform the ranking, by a trained machine learning model, of the list of the one or more electric vehicle charging points by determining a text review of the electric vehicle charging point, and adjusting the ranking of the electric vehicle charging point based on the text review.

In this feature, the disclosed system may use text entries from user reviews to create labeling for the system. In an aspect, the system could then identify implicitely why user is not going to a given station. For example, a Tesla EVCP may have 5 stars reviews and very good reviews, thus the system may infere that user does not like Tesla EVCP, as it would otherwise have no good reason not to go there. In an aspect, the system would of course need to gather and process some data in order to be able to make such conclusions. The system would have to determine a pattern (or find such explanation on a forum, for example).

In some instances, the system may also ask the user why he made such a choice, in order to properly label its data and make the right conclusion for future recommendations. For example, the system may prompt the user with "I have never seen you go to Tesla Charging station before, why are you visiting one today?"

In another aspect of the disclosure, the disclosed system may perform the ranking, by a trained machine learning model, the list of the one or more electric vehicle charging points by determining why the user changed a frequency of going to the electric vehicle charging point; and/or determining a seasonal behavior of the user visiting the electric vehicle charging point.

As the system learns about user behaviors over time, it may also be able to detect changes in frequency at some stations, brands, etc. Based on the collected data, the system might be able to make conclusions on why this happens. If the data can be anonymized and shared, this could be valuable information for the EVCP companies which could keep improving their EVCP by leveraging relevant insights. The system may determine that people come less to this EVCP because a new one opened nearby and although it is more expensive, customers like to have a shopping mall just next to it.

In addition, many of the previously described features have a high seasonality dependancy (weather, vacation time, etc). Hence, like for traffic modeling, it is important that the system accurately labels the data in accordance with seasonality information and also make recommendations in relation to the seasonality data.

In another aspect of the disclosure, the disclosed system may be used to create a feedback loop which allows humans to give feedback to actions which they did themselves or were suggested by AI so that ML models could be trained with this labelled data.

For example, a user may provide feedback for a recommendation or proposal with "Do not suggest me again to go EV charging when: it is raining or have few mm of water on the ground"; or "Time is short and I have meeting with my manager right after (any delay would put me in uncomfortable situation)". Or, positive feedback may be provided to reinforce the recommendation in the same context in the future.

In an aspect of the disclosure, additional context may be added or detected:

Convenience (noise, view, rain protection, etc);

Comfort (easier to park);

Safety.

Some of those attributes may be automatically measured or indirectly (e.g., using stress sensors).

FIG. 1 illustrates a schematic diagram of a network environment 100 of a system 102 for determining personalized recommendations of electric vehicle charging points based on contextual charging behavior of a user in accordance with an example aspect. The system 102 may be communicatively coupled with, a user equipment (UE) 104, an OEM cloud 106, a mapping platform 108, via a network 110. The UE 104 may be a vehicle electronics system, onboard automotive electronics/computers, a mobile device such as a smartphone, tablet, smart watch, smart glasses, laptop, wearable device or other UE platforms known to one of skill in the art. The mapping platform 108 may further include a server 108A and a database 108B. The user equipment includes an application 104A, a user interface 104B, and a sensor unit 104C. Further, the server 108A and the database 108B may be communicatively coupled to each other.

The system 102 may comprise suitable logic, circuitry, interfaces and code that may be configured to process the sensor data obtained from the UE 104 for road and weather conditions in a region, that may be used to assist a user or driver to determine personalized recommendations of electric vehicle charging points based on contextual charging behavior of a user. Such features can also include proximity, parking possible, type of chargers, covered spaces, modes of payment, number of available EVCPs, quality of the environment, view/landscape around, premium features, ability to do something while waiting, convenience or a combination thereof.

The system 102 may be communicatively coupled to the UE 104, the OEM cloud 106, and the mapping platform 108 directly via the network 110. Additionally, or alternately, in some example aspects, the system 102 may be communicatively coupled to the UE 104 via the OEM cloud 106 which in turn may be accessible to the system 102 via the network 110.

All the components in the network environment 100 may be coupled directly or indirectly to the network 110. The components described in the network environment 100 may be further broken down into more than one component and/or combined together in any suitable arrangement. Further, one or more components may be rearranged, changed, added, and/or removed. Furthermore, fewer or additional components may be in communication with the system 102, within the scope of this disclosure.

The system 102 may be embodied in one or more of several ways as per the required implementation. For example, the system 102 may be embodied as a cloud-based service or a cloud-based platform. As such, the system 102 may be configured to operate outside the UE 104. However, in some example aspects, the system 102 may be embodied within the UE 104. In each of such aspects, the system 102 may be communicatively coupled to the components shown in FIG. 1 to carry out the desired operations and wherever required modifications may be possible within the scope of the present disclosure.

The UE 104 may be a vehicle electronics system, onboard automotive electronics/computers, a mobile device such as a smartphone, tablet, smart watch, smart glasses, laptop, wearable device and the like that is portable in itself or as a part of another portable/mobile object, such as, a vehicle known to one of skill in the art. The UE 104 may comprise a processor, a memory and a network interface. The processor, the memory and the network interface may be communicatively coupled to each other. In some example aspects, the UE 104 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In such example aspects, the UE 104 may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the UE 104. Additional, different, or fewer components may be provided. For example, the UE 104 may be configured to execute and run mobile applications such as a messaging application, a browser application, a navigation application, and the like. In accordance with an aspect, the UE 104 may be directly coupled to the system 102 via the network 110. For example, the UE 104 may be a dedicated vehicle (or a part thereof) for gathering data for development of the map data in the database 108B. In some example aspects, the UE 104 may be coupled to the system 102 via the OEM cloud 106 and the network 110. For example, the UE 104 may be a consumer mobile phone (or a part thereof) and may be a beneficiary of the services provided by the system 102. In some example aspects, the UE 104 may serve the dual purpose of a data gatherer and a beneficiary device. The UE 104 may be configured to provide sensor data to the system 102. In accordance with an aspect, the UE 104 may process the sensor data for information that may be used for determining personalized recommendations of electric vehicle charging points based on contextual charging behavior of a user, such as weather, traffic conditions, construction, locality, features, brands, etc. Further, in accordance with an aspect, the UE 104 may be configured to perform processing related to determining personalized recommendations of electric vehicle charging points based on contextual charging behavior of a user.

The UE 104 may include the application 104A with the user interface 104B to access one or more applications. The application 104B may correspond to, but not limited to, map related service application, navigation related service application and location-based service application. In other words, the UE 104 may include the application 104A with the user interface 104B. The user interface 104B may be a dedicated user interface configured to show personalized recommendations of electric vehicle charging points based on contextual charging behavior of a user. The user interface 104B may be in the form of a map depicting regions with favorable or unfavorable EVCPs based on a user's preferences and contextual conditions of the area and the trip, according to aspects of the disclosure.

The sensor unit 104C may be embodied within the UE 104. The sensor unit 104C comprising one or more sensors may capture sensor data, in a certain geographic location. In accordance with an aspect, the sensor unit 104C may be built-in, or embedded into, or within interior of the UE 104. The one or more sensors (or sensors) of the sensor unit 104C may be configured to provide the sensor data comprising location data associated with a location of a user. In accordance with an aspect, the sensor unit 104C may be configured to transmit the sensor data to an Original Equipment Manufacturer (OEM) cloud. Examples of the sensors in the sensor unit 104C may include, but not limited to, a microphone, a camera, an acceleration sensor, a gyroscopic sensor, a LIDAR sensor, a proximity sensor, and a motion sensor.

The sensor data may refer to sensor data collected from a sensor unit 104C in the UE 104. In accordance with an aspect, the sensor data may be collected from a large number of mobile phones. In accordance with an aspect, the sensor data may refer to the point cloud data. The point cloud data may be a collection of data points defined by a given coordinates system. In a 3D coordinates system, for instance, the point cloud data may define the shape of some real or created physical objects. The point cloud data may be used to create 3D meshes and other models used in 3D modelling for various fields. In a 3D Cartesian coordinates system, a point is identified by three coordinates that, taken together, correlate to a precise point in space relative to a point of origin. The LIDAR point cloud data may include point measurements from real-world objects or photos for a point cloud data that may then be translated to a 3D mesh or NURBS or CAD model. In accordance with an aspect, the sensor data may be converted to units and ranges compatible with the system 102, to accurately receive the sensor data at the system 102. Additionally, or alternately, the sensor data of a UE 104 may correspond to movement data associated with a user of the user equipment. Without limitations, this may include motion data, position data, orientation data with respect to a reference and the like.

The mapping platform 108 may comprise suitable logic, circuitry, interfaces and code that may be configured to store map data associated with a geographic area in the region of interest related to geographic or other physical features that may assist in determining personalized recommendations of electric vehicle charging points based on contextual charging behavior of a user. The map data may include traffic features and include historical (or static) traffic features such as road layouts, pre-existing road networks, business, educational and recreational locations, POI locations, historical and real-time weather conditions in the region or a combination thereof. The server 108A of the mapping platform 108 may comprise processing means and communication means. For example, the processing means may comprise one or more processors configured to process requests received from the system 102 and/or the UE 104. The processing means may fetch map data from the database 108B and transmit the same to the system 102 and/or the UE 104 in a suitable format. In one or more example aspects, the mapping platform 108 may periodically communicate with the UE 104 via the processing means to update a local cache of the map data stored on the UE 104. Accordingly, in some example aspects, map data may also be stored on the UE 104 and may be updated based on periodic communication with the mapping platform 108.

In an aspect, the map data may include, and the database 108B of the mapping platform 108 may store real-time, dynamic data about features determining personalized recommendations of electric vehicle charging points based on contextual charging behavior of a user. For example, real-time data may be collected for determining personalized recommendations of electric vehicle charging points based on contextual charging behavior of a user, such as wait times/queues; noise levels; weather; congestion around; available time of the driver (is the driver in a rush or not); charging capacity (if the grid does some load balancing and does not allow high capacity at this time); open shop/cinema near the EVCP; user reviews; safety related features: at night, presence of emergency phone as no person may be in the shop unlike for gasoline; construction on route; friction/difficulty to get to a given place/EVCP; variance in ETA, charging, etc.; likelihood to find an iced-over EVCP in winter; other dynamic, context-dependent preferencesor a combination thereof. Other data records may include computer code instructions and/or algorithms for executing a trained machine learning model that is capable of determining personalized recommendations of electric vehicle charging points based on contextual charging behavior of a user.

The database 108B of the mapping platform 108 may store map data of one or more geographic regions that may correspond to a city, a province, a country or of the entire world. The database 108B may store point cloud data collected from the UE 104. The database 108B may store data such as, but not limited to, node data, road segment data, link data, point of interest (POI) data, link identification information, and heading value records. The database 108B may also store cartographic data, routing data, and/or maneuvering data. According to some example aspects, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities for identifying location of building.

Optionally, the database 108B may contain path segment and node data records, such as shape points or other data that may represent raised features and vehicle speed control indications, links or areas in addition to or instead of the vehicle road record data. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The database 108B may also store data about the POIs and their respective locations in the POI records. The database 108B may additionally store data about places, such as cities, towns, or other communities, and other geographic features such as bodies of water, and mountain ranges. Such place or feature data can be part of the POI data or can be associated with POIs or POI data records (such as a data point used for displaying or representing a position of a city). In addition, the database 108B may include event data (e.g., traffic incidents, construction activities, scheduled events, unscheduled events, accidents, diversions etc.) associated with the POI data records or other records of the database 108B. Optionally or additionally, the database 108B may store 3D building maps data (3D map model of objects) of structures, topography and other visible features surrounding roads and streets, including raised features on the roads.

The database 108B may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the UE 104. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the database 108B may be a master geographic database, but in alternate aspects, the database 108B may be embodied as a client-side map database and may represent a compiled navigation database that may be used in or with end user devices (such as the UE 104) to provide navigation and/or map-related functions. In such a case, the database 108B may be downloaded or stored on the end user devices (such as the UE 104).

The network 110 may comprise suitable logic, circuitry, and interfaces that may be configured to provide a plurality of network ports and a plurality of communication channels for transmission and reception of data, such as the sensor data, map data from the database 108B, etc. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 110 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 110 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) networks (for e.g. LTE-Advanced Pro), 5G New Radio networks, ITU-IMT 2020 networks, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

The system, apparatus, method and computer program product described above may be any of a wide variety of computing devices and may be embodied by either the same or different computing devices. The system, apparatus, etc. may be embodied by a server, a computer workstation, a distributed network of computing devices, a personal computer or any other type of computing device. The system, apparatus, method and computer program product may be configured to determine personalized recommendations of electric vehicle charging points based on contextual charging behavior of a usermay similarly be embodied by the same or different server, computer workstation, distributed network of computing devices, personal computer, or other type of computing device.

Alternatively, the system, apparatus, method and computer program product may be embodied by a computing device on board a vehicle, such as a computer system of a vehicle, e.g., a computing device of a vehicle that supports safety-critical systems such as the powertrain (engine, transmission, electric drive motors, etc.), steering (e.g., steering assist or steer-by-wire), and/or braking (e.g., brake assist or brake-by-wire), a navigation system of a vehicle, a control system of a vehicle, an electronic control unit of a vehicle, an autonomous vehicle control system (e.g., an autonomous-driving control system) of a vehicle, a mapping system of a vehicle, an Advanced Driver Assistance System (ADAS) of a vehicle), or any other type of computing device carried by the vehicle. Still further, the apparatus may be embodied by a computing device of a driver or passenger on board the vehicle, such as a mobile terminal, e.g., a personal digital assistant (PDA), mobile telephone, smart phone, personal navigation device, smart watch, tablet computer, or any combination of the aforementioned and other types of portable computer devices.

FIG. 2 illustrates a block diagram 200 of the system 102, exemplarily illustrated in FIG. 1, to determine personalized recommendations of electric vehicle charging points based on contextual charging behavior of a user, in accordance with an example aspect. FIG. 2 is described in conjunction with elements from FIG. 1.

As shown in FIG. 2, the system 102 may comprise a processing means such as a processor 202, storage means such as a memory 204, a communication means, such as a network interface 206, an input/output (I/O) interface 208, and a machine learning model 210. The processor 202 may retrieve computer executable instructions that may be stored in the memory 204 for execution of the computer executable instructions. The system 102 may connect to the UE 104 via the I/O interface 208. The processor 202 may be communicatively coupled to the memory 204, the network interface 206, the I/O interface 208, and the machine learning model 210.

The processor 202 may comprise suitable logic, circuitry, and interfaces that may be configured to execute instructions stored in the memory 204. The processor 202 may obtain sensor data associated with personalized recommendations of electric vehicle charging points based on contextual charging behavior of a user. The sensor data may be captured by one or more UE, such as the UE 104. The processor 202 may be configured to determine personalized recommendations of electric vehicle charging points based on contextual charging behavior of a user, based on the sensor data. The processor 202 may be further configured to determine, using a trained machine learning model in conjunction with ground truth of the region, to determine personalized recommendations of electric vehicle charging points based on contextual charging behavior of a user on a given link at a given time based on the mapped EVCPs and a training feature dataset, where the ground truth of a region comprises current features of a link and EVCPs and their features/attributes.

Examples of the processor 202 may be an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits. The processor 202 may implement a number of processor technologies known in the art such as a machine learning model, a deep learning model, such as a recurrent neural network (RNN), a convolutional neural network (CNN), and a feed-forward neural network, or a Bayesian model. As such, in some aspects, the processor 202 may include one or more processing cores configured to perform independently. A multi-core processor may enable multiprocessing within a single physical package.

Additionally, or alternatively, the processor 202 may include one or more processors configured in tandem via the bus to enable independent execution of instructions, pipelining and/or multithreading. Additionally, or alternatively, the processor 202 may include one or processors capable of processing large volumes of workloads and operations to provide support for big data analysis. However, in some cases, the processor 202 may be a processor specific device (for example, a mobile terminal or a fixed computing device) configured to employ an aspect of the disclosure by further configuration of the processor 202 by instructions for performing the algorithms and/or operations described herein.

In some aspects, the processor 202 may be configured to provide Internet-of-Things (IoT) related capabilities to users of the UE 104 disclosed herein. The IoT related capabilities may in turn be used to provide smart city solutions by providing real time weather and road updates, big data analysis, and sensor-based data collection for providing navigation and charging locations near critical areas. The environment may be accessed using the I/O interface 208 of the system 102 disclosed herein.

The memory 204 may comprise suitable logic, circuitry, and interfaces that may be configured to store a machine code and/or instructions executable by the processor 202. The memory 204 may be configured to store information including processor instructions for training the machine learning model. The memory 204 may be used by the processor 202 to store temporary values during execution of processor instructions. The memory 204 may be configured to store different types of data, such as, but not limited to, sensor data from the UE 104. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may comprise suitable logic, circuitry, and interfaces that may be configured to communicate with the components of the system 102 and other systems and devices in the network environment 100, via the network 110. The network interface 206 may communicate with the UE 104, via the network 110 under the control of the processor 202. In one aspect, the network interface 206 may be configured to communicate with the sensor unit 104C disclosed in the detailed description of FIG. 1. In an alternative aspect, the network interface 206 may be configured to receive the sensor data from the OEM cloud 106 over the network 110 as described in FIG. 1. In some example aspects, the network interface 206 may be configured to receive location information of a user associated with a UE (such as, the UE 104), via the network 110. In accordance with an aspect, a controller of the UE 104 may receive the sensor data from a positioning system (for example: a GPS based positioning system) of the UE 104. The network interface 206 may be implemented by use of known technologies to support wired or wireless communication of the system 102 with the network 110. Components of the network interface 206 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer circuit.

The I/O interface 208 may comprise suitable logic, circuitry, and interfaces that may be configured to operate as an I/O channel/interface between the UE 104 and different operational components of the system 102 or other devices in the network environment 100. The I/O interface 208 may facilitate an I/O device (for example, an I/O console) to receive an input (e.g., sensor data from the UE 104 for a time duration) and present an output to one or more UE (such as, the UE 104) based on the received input. In accordance with an aspect, the I/O interface 208 may obtain the sensor data from the OEM cloud 106 to store in the memory 202. The I/O interface 208 may include various input and output ports to connect various I/O devices that may communicate with different operational components of the system 102. In accordance with an aspect, the I/O interface 208 may be configured to output mitigation and/or confirmation of critical areas to a user device, such as, the UE 104 of FIG. 1.

In example aspects, the I/O interface 208 may be configured to provide the data associated with personalized EVCP recommendations to the database 108A to update the map of a certain geographic region. In accordance with an aspect, a user requesting information in a geographic region may be updated about historical (or static) road features, real-time or historical weather conditions, road conditions, road construction, etc. Examples of the input devices may include, but are not limited to, a touch screen, a keyboard, a mouse, a joystick, a microphone, and an image-capture device. Examples of the output devices may include, but are not limited to, a display, a speaker, a haptic output device or other sensory output devices.

In accordance with an aspect, the processor 202 may train the one or more machine learning models 210 to assist in determining personalized recommendations of electric vehicle charging points based on contextual charging behavior of a user. In an aspect of the disclosure, the processor 202 may predict, based on the one or more trained machine learning models in conjunction with ground truth of the region, such as proximity, parking possible, type of chargers, covered spaces, modes of payment, number of available EVCPs, quality of the environment, view/landscape around, premium features, ability to do something while waiting, convenience; or a combination thereof a personalized EVCP recommendation. In an aspect, a weighted linear regression model may be used to predict, based on the one or more trained machine learning models in conjunction with ground truth of the region, such as proximity, parking possible, type of chargers, covered spaces, modes of payment, number of available EVCPs, quality of the environment, view/landscape around, premium features, ability to do something while waiting, convenience; or a combination thereof, a personalized EVCP recommendation. In another aspect, a look-up table may be used for predicting, based on the one or more trained machine learning models in conjunction with ground truth of the region, such as proximity, parking possible, type of chargers, covered spaces, modes of payment, number of available EVCPs, quality of the environment, view/landscape around, premium features, ability to do something while waiting, convenience; or a combination thereof, a personalized EVCP recommendation.

In another aspect, a machine learning model, such as the one or more trained machine learning models 210 discussed earlier, may be used to determine personalized recommendations of electric vehicle charging points based on contextual charging behavior of a user. In accordance with an aspect, the trained machine learning models 210 may be trained offline to obtain a classifier model to determine personalized recommendations of electric vehicle charging points based on contextual charging behavior of a user, based on one or more trained machine learning models in conjunction with ground truth of the region, such as EVCP recommendaitons and their context as derived from a map and one or more sensors along the link, a determination of personalized EVCP recommendaitons. For the training of the trained machine learning models 210, different feature selection techniques and classification techniques may be used. The system 102 may be configured to obtain the trained machine learning models 210 and the trained machine learning models 210 may leverage historical information and real-time data for determining personalized recommendations of electric vehicle charging points based on contextual charging behavior of a user, based on one or more trained machine learning models in conjunction with ground truth of the region, such as proximity, parking possible, type of chargers, covered spaces, modes of payment, number of available EVCPs, quality of the environment, view/landscape around, premium features, ability to do something while waiting, convenience; or a combination thereof. In one aspect, supervised machine learning techniques may be utilized where ground truth data is used to train the model for different scenarios and then in areas where there is not sufficient ground truth data, the trained machine learning models 210 can be used to predict features or results.

In an aspect, the trained machine learning model 210 may be complemented or substituted with a transfer learning model. The transfer learning model may be used when the contextual factors related to personalized EVCP recommendations, such as proximity, parking possible, type of chargers, covered spaces, modes of payment, number of available EVCPs, quality of the environment, view/landscape around, premium features, ability to do something while waiting, convenience; or a combination thereof are unavailable, sparse, incomplete, corrupted or otherwise unreliable for predicting critical areas in a region. The transfer learning model may then use historical EVCP recommendations for determining personalized EVCP recommendations in a new region.

In accordance with an aspect, various data sources may provide the static and dynamic information for personalized EVCP recommendations such as aggregations of locations and conditions that contribute to the preferability of an EVCP for a given link at a given time as an input to the machine learning models 210. Examples of the machine learning models 210 may include, but not limited to, Decision Tree (DT), Random Forest, and Ada Boost. In accordance with an aspect, the memory 204 may include processing instructions for training of the machine learning model 210 with data set that may be real-time (or near real time) data or historical data. In accordance with an aspect, the data may be obtained from one or more service providers.

FIG. 3 illustrates an example map or geographic database 307, which may include various types of geographic data 340. The database may be similar to or an example of the database 108B. The data 340 may include but is not limited to node data 342, road segment or link data 344, map object and point of interest (POI) data 346, EVCP feature data records 348, or the like (e.g., other data records 350 such as traffic data, sidewalk data, road dimension data, building dimension data, vehicle dimension/turning radius data, etc.). Other data records may include computer code instructions and/or algorithms for executing a trained machine learning model that is capable of determining personalized recommendations of electric vehicle charging points based on contextual charging behavior of a user.

A profile of end user mobility graph and personal activity information may be obtained by any functional manner including those detailed in U.S. Pat. Nos. 9,766,625 and 9,514,651, both of which are incorporated herein by reference. This data may be stored in one of more of the databases discussed above including as part of the EVCP feature data records 348 in some aspects. This data may also be stored elsewhere and supplied to the system 102 via any functional means.

In one aspect, the following terminology applies to the representation of geographic features in the database 307. A "Node"—is a point that terminates a link, a "road/line segment"—is a straight line connecting two points, and a "Link" (or "edge") is a contiguous, non-branching string of one or more road segments terminating in a node at each end. In one aspect, the geographic database 307 follows certain conventions. For example, links do not cross themselves and do not cross each other except at a node. Also, there are no duplicated shape points, nodes, or links. Two links that connect each other have a common node.

The geographic database 307 may also include cartographic data, routing data, and/or maneuvering data as well as indexes 352. According to some example aspects, the road segment data records may be links or segments representing roads, streets, or paths, as may be used in calculating a route or recorded route information for determination of personalized EVCP recommendations. The node data may be end points (e.g., intersections) corresponding to the respective links or segments of road segment data. The road link data and the node data may represent a road network, such as used by vehicles, cars, trucks, buses, motorcycles, bikes, scooters, and/or other entities.

Optionally, the geographic database 307 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The geographic database 307 can include data about the POIs and their respective locations in the POI records. The geographic database 307 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The geographic database 307 may be maintained by a content provider e.g., the map data service provider and may be accessed, for example, by the content or service provider processing server. By way of example, the map data service provider can collect geographic data and dynamic data to generate and enhance the map database and dynamic data such as weather- and traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device, as they travel the roads throughout a region.

The geographic database 307 may be a master map database, such as an HD map database, stored in a format that facilitates updates, maintenance, and development. For example, the master map database or data in the master map database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the geographic database 307 may be a master geographic database, but in alternate aspects, a client-side map database may represent a compiled navigation database that may be used in or with end user devices to provide navigation and/or map-related functions. For example, the map database may be used with the mobile device to provide an end user with navigation features. In such a case, the map database can be downloaded or stored on the end user device which can access the map database through a wireless or wired connection, such as via a processing server and/or a network, for example.

The EVCP feature data records 348 may include various points of data such as, but not limited to: proximity, parking possible, type of chargers, covered spaces, modes of payment, number of available EVCPs, quality of the environment, view/landscape around, premium features, ability to do something while waiting, convenience; or a combination thereof.

FIG. 4 illustrates a flowchart 400 for acts taken in an exemplary method for determining personalized recommendations of electric vehicle charging points based on contextual charging behavior of a user, in accordance with an aspect. More, fewer or different steps may be provided. FIG. 4 is explained in conjunction with FIG. 1 to FIG. 3. The control starts at act 402.

At act 402, the system 102 may determine, by a processor in an electric vehicle, that the user needs to charge the electric vehicle.

At act 404, the system 102 may determine, by the processor in the electric vehicle, a plurality of contextual conditions related to personal preferences of the user, a vehicle type of the electric vehicle and/or a location of the electric vehicle.

In an aspect, the system 102 may determine, by the processor in the electric vehicle, a plurality of contextual conditions related to personal preferences of the user, a vehicle type of the electric vehicle and/or a location of the electric vehicle by determining static personal preferences of the user related to features at a potential electric vehicle charging point and/or dynamic personal preferences of the user related to time-varying or contextual conditions at the potential electric vehicle charge point.

In an aspect, examples of static personal preferences may include the, but are not limited to:

Brands
Proximity
Parking possible
Type of chargers
Covered space
Modes of payment
Number of available EVCP
Quality of the environment
View/landscape around
Premium features
Ability to do something while waiting
Convenience
etc.

In an aspect, examples of dynamic personal preferences may include the, but are not limited to:

Wait times/queues;
Noise levels;
Weather;
Congestion around;
Available time of the driver (is the driver in a rush or not);
Charging capacity (if the grid does some load balancing and does not allow high capacity at this time);
Open shop/cinema near the EVCP;
User reviews;
Safety related features: at night, presence of emergency phone as no person may be in the shop unlike for gasoline;
Construction on route;
Friction/difficulty to get to a given place/EVCP;
Variance in ETA, charging, etc.;
Likelihood to find an iced-over EVCP in winter;
Other dynamic, context-dependent preferences.

At act 406, the system 102 may prepare a list of one or more electric vehicle charging points in a predetermined distance from the location of the electric vehicle.

At act 408, the system 102 may rank, by a trained machine learning model, the list of the one or more electric vehicle charging points based on the plurality of contextual conditions related to personal preferences of the user, the vehicle type of the electric vehicle and/or the location of the electric vehicle. In an aspect, the system 102 may rank, by the trained machine learning model, the list of the one or more electric vehicle charging points by adjusting the ranking by emphasizing features out of the personal preferences of the user not available at a suggested electric vehicle charging point. In an aspect, the system 102 may rank, by the trained machine learning model, the list of the one or more electric vehicle charging points determining one or more exceptional situations related to the user needing to charge the electric vehicle at the electric vehicle charging point and/or by determining a frequency of the one or more exceptional situations; and excluding an occurrence of the one or more exceptional situations from the ranked list. In an aspect, the system 102 may rank, by the trained machine learning model, the list of the one or more electric vehicle charging points by determining a mobility graph of the user; and adjusting the ranked list based on the mobility graph of the user. In an aspect, the system 102 may rank, by the trained machine learning model, the list of the one or more electric vehicle charging points by determining a list of missing features in the list of the one or more electric vehicle charging points; and/or determining a recommended electric vehicle charging point based on the list of missing features and the personal preferences of the user. In an aspect, the system 102 may rank, by a trained machine learning model, the list of the one or more electric vehicle charging points by determining why the user changed a frequency of going to the electric vehicle charging point; and/or determining a seasonal behavior of the user visiting the electric vehicle charging point. In a further aspect, the system 102 may rank, by a trained machine learning model, the list of the one or more electric vehicle charging points by determining a text review of the electric vehicle charging point; and adjusting the ranking of the electric vehicle charging point based on the text review.

At act 410, the system 102 may provide, by a vehicle interface system, a portion of the ranked list of the one or more electric vehicle charging points. In an aspect, the system 102 may provide, by a vehicle interface system, the portion of the ranked list of the one or more electric vehicle charging points by notifying the user of a last electric vehicle charging point matching a set of the user's personal preferences before a predetermined range.

In an aspect, the system 102 may use a transfer learning model based on the trained machine learning model in a new area different from the one or more areas used in ranking the list of the one or more electric vehicle charging points.

It may be contemplated that various applications of the disclosed system 102 may arise in usage. In an aspect, the system and method for determining personalized recommendations of electric vehicle charging points based on contextual charging behavior of a user represents a natural evolution from EVCP, from "show me the EVCPs around my location" to "show me the ones I would prefer based on my habits. A personalized recommendation of charge points may integrate well with increasingly personalized driving experience for conventional and electric vehicles, leading to autonomous vehicles. Drivers increasingly are exposed to mobile Internet along with ever-improving navigation systems, entertainment systems and 360 degree sensor/camera packages on their vehicles. Personalized EVCP recommendations are a natural progression to these convenience features in vehicles.

In an aspect, the system and method for determining personalized recommendations of electric vehicle charging points based on contextual charging behavior of a user may be relevant for OEMs such as vehicle manufacturers or software providers, mapping apps, hospitality and service providers who may cater to EV drivers to visit their establishment based on features and recommendations about the EVCP locations.

Blocks of the flowchart 400 support combinations of means for performing the specified functions and combinations of operations for performing the specified functions for performing the specified functions. It will also be understood that one or more blocks of the flowchart 500, and combinations of blocks in the flowchart 400, can be implemented by special purpose hardware-based computer systems which perform the specified functions, or combinations of special purpose hardware and computer instructions.

Alternatively, the system may comprise means for performing each of the operations described above. In this regard, according to an example aspect, examples of means for performing operations may comprise, for example, the processor 202 and/or a device or circuit for executing instructions or executing an algorithm for processing information as described above.

Although the aforesaid description of FIGS. 1-4 is provided with reference to the sensor data, however, it may be understood that the disclosure would work in a similar manner for different types and sets of data as well. The system 102 may generate/train the machine learning models 210 to evaluate different sets of data at various geographic locations. The update may be provided as a run time update or a pushed update.

It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an aspect of the present disclosure and executed by the processing circuitry 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that modifications and other aspects are intended to be included within the scope of the appended claims. Furthermore, in some aspects, additional optional operations may be included. Modifications, additions, or amplifications to the operations above may be performed in any order and in any combination.

Moreover, although the foregoing descriptions and the associated drawings describe example aspects in the context of certain example combinations of elements and/or functions, it should be appreciated that different combinations of elements and/or functions may be provided by alternative aspects without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method for determining personalized recommendations of electric vehicle charging points (EVCPs) based on contextual charging behavior of a user, the method comprising:

determining, by a processor in an electric vehicle, that the user needs to charge the electric vehicle;

determining, by the processor in the electric vehicle, a plurality of contextual conditions related to personal preferences of the user, a vehicle type of the electric vehicle and/or a location of the electric vehicle, wherein the personal preferences comprise static personal preferences and/or dynamic personal preferences;

determining, from sensors in communication with one or more EVCPs, a plurality of features and a plurality of contextual conditions related to the one or more EVCPs;

preparing a list of one or more EVCPs in a predetermined distance from the location of the electric vehicle;

ranking, by a trained machine learning model, the list of the one or more EVCPs based on the plurality of contextual conditions related to personal preferences of the user, the vehicle type of the electric vehicle and/or the location of the electric vehicle, wherein the trained machine learning model applies weighted values associated with at least the static personal preferences and ranks the list further based on the dynamic personal preferences and wherein the ranking comprises identifying an exceptional charging situation in which selection of an EVCP is not indicative of the personal preferences of the user, and preventing data associated with the exceptional charging situation from being used to learn or update the personal preferences of the user; and providing, by a vehicle interface system, a portion of the ranked list of the one or more EVCPs.

2. The method of claim 1, where determining, by the processor in the electric vehicle, a plurality of contextual conditions related to the personal preferences of the user, a vehicle type of the electric vehicle and/or a location of the electric vehicle comprises determining the static personal preferences of the user related to features at a EVCP and/or the dynamic personal preferences of the user related to time-varying or contextual conditions at a potential EVCP.

3. The method of claim 1, where ranking, by the trained machine learning model, the list of the one or more EVCPs comprises adjusting the ranking by emphasizing features out of the personal preferences of the user not available at a suggested EVCP.

4. The method of claim 1, wherein the exceptional charging situation is identified based on at least one of:

a charging level of the electric vehicle relative to a charging comfort zone of the user;

a determination that the selected EVCP is a closest EVCP among candidate EVCPs despite being ranked lower in terms of matching the personal preferences of the user; or a user indication that the selected EVCP was the only option.

5. The method of claim 1, where ranking, by the trained machine learning model, the list of the one or more EVCPs comprises determining a mobility graph of the user; and adjusting the ranked list based on the mobility graph of the user.

6. The method of claim 1, where ranking, by the trained machine learning model, the list of the one or more EVCPs comprises: determining a list of missing features in the list of the one or more EVCPs; and determining a recommended EVCPs based on the list of missing features and the personal preferences of the user.

7. The method of claim 1, where providing, by a vehicle interface system, the portion of the ranked list of the one or more EVCPs comprises notifying the user of a last EVCP matching a set of the user's personal preferences before a predetermined range.

8. The method of claim 1, where ranking, by a trained machine learning model, the list of the one or more EVCPs comprises determining why the user changed a frequency of going to the EVCP; and determining a seasonal behavior of the user visiting the EVCP.

9. The method of claim 1, where ranking, by a trained machine learning model, the list of the one or more EVCPs comprises determining a text review of the EVCP; and adjusting the ranking of the EVCP based on the text review.

10. A system to determining personalized recommendations of EVCPs based on contextual charging behavior of a user, comprising:

at least one memory configured to store computer executable instructions; and at least one processor configured to execute the computer executable instructions to:

determine, by a processor in an electric vehicle, that the user needs to charge the electric vehicle;

determine, by the processor in the electric vehicle, a plurality of contextual conditions related to personal preferences of the user, a vehicle type of the electric vehicle and/or a location of the electric vehicle, wherein the personal preferences comprise static personal preferences and/or dynamic personal preferences;

determine, from sensors in communication with one or more EVCPs, a plurality of features and a plurality of contextual conditions related to the one or more EVCPs;

prepare a list of one or more EVCPs in a predetermined distance from the location of the electric vehicle;

rank, by a trained machine learning model, the list of the one or more EVCPs based on the plurality of contextual conditions related to personal preferences of the user, the vehicle type of the electric vehicle and/or the location of the electric vehicle, wherein the trained machine learning model applies weighted values associated with at least the static personal preferences and ranks the list further based on the dynamic personal preferences and wherein the ranking comprises identifying an exceptional charging situation in which selection of an EVCP is not indicative of the personal preferences of the user, and preventing data associated with the exceptional charging situation from being used to learn or update the personal preferences of the user; and provide, by a vehicle interface system, a portion of the ranked list of the one or more EVCPs.

11. The system of claim 10, where the computer executable instructions to determine, by the processor in the electric vehicle, a plurality of contextual conditions related to personal preferences of the user, a vehicle type of the electric vehicle and/or a location of the electric vehicle comprise computer executable instructions to determine static personal preferences of the user related to features at a potential EVCP and/or dynamic personal preferences of the user related to time-varying or contextual conditions at the potential electric vehicle charge point.

12. The system of claim 10, where the computer executable instructions to rank, by the trained machine learning model, the list of the one or more EVCPs comprise computer executable instructions to adjust the ranking by emphasizing features out of the personal preferences of the user not available at a suggested EVCP.

13. The system of claim 10, where the computer executable instructions to rank, by the trained machine learning model, the list of the one or more EVCPs comprise computer executable instructions to determine a frequency of the one or more exceptional situations.

14. The system of claim 10, where the computer executable instructions to rank, by the trained machine learning model, the list of the one or more EVCPs comprise computer executable instructions to determine a mobility graph of the user; and adjusting the ranked list based on the mobility graph of the user.

15. A computer program product comprising a non-transitory computer readable medium having stored thereon computer executable instructions, which when executed by one or more processors, cause the one or more processors to carry out operations to determine personalized recommendations of EVCPs based on contextual charging behavior of a user, the operations comprising:

determining, by a processor in an electric vehicle, that the user needs to charge the electric vehicle;

determining, by the processor in the electric vehicle, a plurality of contextual conditions related to personal preferences of the user, a vehicle type of the electric vehicle and/or a location of the electric vehicle, wherein the personal preferences comprise static personal preferences and/or dynamic personal preferences;

determining, from sensors in communication with one or more EVCPs, a plurality of features and a plurality of contextual conditions related to the one or more EVCPs;

preparing a list of one or more EVCPs in a predetermined distance from the location of the electric vehicle;

ranking, by a trained machine learning model, the list of the one or more EVCPs based on the plurality of contextual conditions related to personal preferences of the user, the vehicle type of the electric vehicle and/or the location of the electric vehicle, wherein the trained machine learning model applies weighted values associated with at least the static personal preferences and ranks the list further based on the dynamic personal preferences and wherein the ranking comprises identifying an exceptional charging situation in which selection of an EVCP is not indicative of the personal preferences of the user, and preventing data associated with the exceptional charging situation from being used to learn or update the personal preferences of the user; and providing, by a vehicle interface system, a portion of the ranked list of the one or more EVCPs.

16. The computer program product of claim 15, where the operations for determining, by the processor in the electric vehicle, a plurality of contextual conditions related to personal preferences of the user, a vehicle type of the electric vehicle and/or a location of the electric vehicle comprise operations for determining static personal preferences of the user related to features at a potential EVCP and/or dynamic personal preferences of the user related to time-varying or contextual conditions at the potential electric vehicle charge point.

17. The computer program product of claim 15, where the operations for ranking, by the trained machine learning model, the list of the one or more EVCPs comprise operations for adjusting the ranking by emphasizing features out of the personal preferences of the user not available at a suggested EVCP.

18. The computer program product of claim 15, where the operations for ranking, by the trained machine learning model, the list of the one or more EVCPs comprise operations for determining a frequency of the one or more exceptional situations.

19. The computer program product of claim 15, where the operations for ranking, by the trained machine learning model, the list of the one or more EVCPs comprise operations for determining a mobility graph of the user; and adjusting the ranked list based on the mobility graph of the user.

20. The computer program product of claim 15, where the operations for ranking, by the trained machine learning model, the list of the one or more EVCPs comprise operations for: determining a list of missing features in the list of the one or more EVCPs; and determining a recommended EVCP based on the list of missing features and the personal preferences of the user.

* * * * *